UNITED STATES PATENT OFFICE.

GEORGE W. LEIGHTON AND CHARLES S. BABCOCK, OF CHICAGO, ILLINOIS.

COATING MATERIAL FOR PAPER FOR PHOTOGRAPHIC USES.

1,225,146.     Specification of Letters Patent.     Patented May 8, 1917.

No Drawing.     Application filed May 10, 1909. Serial No. 495,167.

*To all whom it may concern:*

Be it known that we, GEORGE W. LEIGHTON and CHARLES S. BABCOCK, citizens of the United States, and residing at Chicago, in the county of Cook and State of Illinois, have invented a new and useful Coating Material for Paper for Photographic Uses, which, with substantially the same treatment employed in the printing and development of platinotype paper, will give the same permanent shades of black, and this without the use of platinum.

The following is a specification of our invention:

*The paper.*—Any sized paper may be used which is free from iron, preferably those makes of paper which have been found to be suitable for platinotype paper.

*Coating.*—The paper is then coated with a water solution containing ferric oxalate, a soluble salt of mercury and a soluble salt of silver. To a solution containing 75 parts (by weight) of water, 12 parts of ferric oxalate and 3.5 parts of silver in the form of a soluble salt, we add a soluble salt of mercury. Any soluble salt of silver may be used, excepting the hyposulfite or cyanid.

Since the weights we give, both of the silver and mercury, are those of the elements themselves, it is to be noticed that allowance must be made for the additional weight of the acid radical when we use the salts of those elements. Thus 3.5 parts of silver would make 5 parts of silver nitrate and 0.46 of mercury would make 1.2 parts of mercuric citrate.

The amount of mercury salt may be varied. Lessening the amount tends to give reddish or brownish blacks, and increasing the amount of mercury salt tends to give bluish black. And again by adding say 5 parts of potassium oxalate to the coating solution, we obtain the same results, using one-half the amount of mercury salt, as we do without the potassium oxalate. Other salts, such as stannic citrate, have the same effect as the potassium oxalate.

We have found that the following formula has given good results:

| | | |
|---|---|---|
| Water (by weight) | 75 | parts |
| Ferric oxalate | 12 | " |
| Silver | 3.5 | " |
| Mercury | 0.46 | " |
| Oxalic acid | 1 | part |

If 5 parts of potassium oxalate are added to the solution, only .2 parts of mercury salt need be used.

The solid ingredients of the above or equivalent formula are thoroughly dissolved in the water and applied as a coating to a suitably sized paper (or other fabric) and the coated paper thoroughly dried. The coating and drying are to be done in the same way as the platinotype papers now on the market are coated and dried. It is then packed in a moist proof and light proof receptacle until used.

*Printing and development.*—To print, the paper is exposed to light under a negative until the image faintly appears. It is then plunged into a solution of neutral potassium oxalate, say, 1 part of potassium oxalate and 4 parts of water. After the image has developed to the right intensity, it is then put into three baths composed of a solution of hydrochloric acid, 1 part acid and 64 parts water. It is left in the first bath five minutes, the second ten minutes and the third fifteen minutes. It is then washed in running water fifteen minutes.

Up to this point the printing, development, and clearing are the same as in the case of a platinotype paper, but our paper now requires to be placed in a fixing bath of hyposulfite of soda, 1 part hyposulfite to 20 parts water for ten minutes and immediately thereafter washed thoroughly.

We are aware that a photographic paper coated with ferric oxalate and silver nitrate has been used, but the said paper so coated does not give a black image on development with potassium oxalate but to secure a black tone it requires a developer containing numerous other chemicals in such exact proportions that it is extremely difficult to make. We are also aware that the paper coated with ferric oxalate and a soluble platinum salt has been used and is now sold under the generic name of platinotype paper; but a photographic paper containing ferric oxalate and silver in conjunction with a mercury salt has never, as far as we know, been used for the purpose of obtaining black tones by the use of a neutral potassium oxalate developer.

It will be understood that the paper may be sensitized by the successive use of one or more solutions of the said materials, and the same need not be all applied at once in one solution.

We claim:

1. The herein described coating material for photographic paper comprising ferric oxalate, a soluble silver salt, and a soluble mercury salt; substantially as specified.

2. A surface suitable for photography, having applied thereto the herein-described sensitive photographic coating comprising ferric oxalate, a soluble silver salt and a soluble mercury salt; substantially as specified.

3. A sensitizing composition for photography, said composition containing ferric oxalate, a silver salt as described, and a mercury salt.

4. A photographic paper coated with a solution of ferric oxalate, a silver salt as described and mercuric oxid, which is capable of being developed as platinotype paper is, substantially as specified.

5. A photographic paper coated with a solution of ferric oxalate, a silver salt as described and any salt of mercury which is soluble in a solution of ferric oxalate, which is capable of being developed as platinotype paper is, substantially as specified.

6. A sensitizer for coating photographic paper consisting of a solution of water of ferric oxalate and of a salt of mercury in said ferric oxalate solution and a silver salt as described, substantially as specified.

GEORGE W. LEIGHTON.
CHARLES S. BABCOCK.

Witnesses:
FREDERICK C. HACK,
CHARLES OLSEN.